US007743388B2

(12) United States Patent
Nikols et al.

(10) Patent No.: US 7,743,388 B2
(45) Date of Patent: *Jun. 22, 2010

(54) COMPUTER DIRECTORY SYSTEM HAVING AN APPLICATION INTEGRATION DRIVER INFRASTRUCTURE

(75) Inventors: Nick N. Nikols, Draper, UT (US); Daniel Wallace Rapp, Alpine, UT (US)

(73) Assignee: Novell, Inc., Provo, UT (US)

( * ) Notice: Subject to any disclaimer, the term of this patent is extended or adjusted under 35 U.S.C. 154(b) by 544 days.

This patent is subject to a terminal disclaimer.

(21) Appl. No.: 11/550,765

(22) Filed: Oct. 18, 2006
(Under 37 CFR 1.47)

(65) Prior Publication Data

US 2007/0226753 A1    Sep. 27, 2007

Related U.S. Application Data

(63) Continuation of application No. 09/470,645, filed on Dec. 22, 1999, now Pat. No. 7,146,614.

(51) Int. Cl.
G06F 3/00 (2006.01)
G06F 9/44 (2006.01)
G06F 9/46 (2006.01)
G06F 13/00 (2006.01)

(52) U.S. Cl. ........................... 719/319; 719/318
(58) Field of Classification Search .................. 719/318, 719/320; 709/223
See application file for complete search history.

(56) References Cited

U.S. PATENT DOCUMENTS

| 5,860,073 A | 1/1999 | Ferrel et al. |
| 5,920,697 A | 7/1999 | Masters et al. |
| 6,012,098 A | 1/2000 | Bayeh et al. |
| 6,101,541 A | 8/2000 | Ellesson et al. |
| 6,125,391 A | 9/2000 | Meltzer et al. |

(Continued)

OTHER PUBLICATIONS

Roisin, Authoring Structured Multimedia Documents, Springer-Verlag Berlin Heidelberg, 1998, pp. 222-239.*

(Continued)

*Primary Examiner*—Diem K Cao
(74) *Attorney, Agent, or Firm*—Marger Johnson & McCollom PC

(57) ABSTRACT

An application integration driver infrastructure for facilitating the use of a distributed directory running in a computer network is provided. The infrastructure can transform specific directory events into a vendor-neutral data identification system and then use vendor-neutral transformation technologies to transform the neutral data identification into a specific application's data format, and vice-versa. The infrastructure receives an event from the distributed directory into a markup language generation system, such as an extensible markup language ("XML") generator. The XML generator converts the event into XML data and provides the XML data to a transformation processing system, such as an extensible transformation language ("XSLT") processor. The XSLT processor transforms the XML data to a predetermined format. The format can be dictated by a stylesheet provided to the XSLT processor, the stylesheet being responsive to requirements of a computer application. The transformed data is then provided to the application for the application to use in a conventional manner. The application may use an application shim to convert the transformed data into a native application program interface ("API") for the application.

13 Claims, 2 Drawing Sheets

U.S. PATENT DOCUMENTS

| | | | |
|---|---|---|---|
| 6,167,448 | A | 12/2000 | Hemphill et al. |
| 6,249,883 | B1 | 6/2001 | Cassidy et al. |
| 6,438,540 | B2 | 8/2002 | Nasr et al. |
| 6,446,077 | B2 | 9/2002 | Straube et al. |
| 6,507,875 | B1 * | 1/2003 | Mellen-Garnett et al. ... 719/310 |
| 6,622,170 | B1 | 9/2003 | Harrison et al. |
| 6,772,396 | B1 | 8/2004 | Cronin et al. |

OTHER PUBLICATIONS

TJ Fleming, Chapter 5—Processing XML Data, digitalcommons.providence.edu, 1997, pp. 1-13.*

Jagannathan et al., Workshop Report on Integrating XML and Distributed Object Technologies, IEEE, Jun. 1999, pp. 1-6.*

W3C, XSL Transformation (XSLT) Specification—Version 1, W3C, Apr. 21 1999, pp. 1-66.*

McGrath, Rendering XML Documents Using XSL, Dr. Dobb's Journal, Jul. 1998, pp. 1-18.*

Smith, Re: How to do XML to XML translation, biglist.com, Jul. 1998, pp. 1-3.*

Suzuki, et al., "Managing the Software Design Documents with XML", ACM, 1998.

Heskett, "An XML Standard for Directory Services", CNET Networks, Inc., Jul. 12, 1999, p. 1.

McCarthy, "Bowstreet Works to Jump-Start XML as Directory Force", InfoWorld Electric, Jul. 13, 1999, pp. 1-2.

Fontana, "Novell and Microsoft Agree on XML—based Standard", CNN, pp. 1-4.

Riggs, "XML Directory Standard Debuts", InformationWeek, pp. 1-2.

Frank, "Netware Directory Services", Lan Magazine/Network Magazine, Apr. 1994.

Khare, et al., Capturing the State of Distributed Systems with XML, Sep. 21, 1997.

* cited by examiner

COMPUTER DIRECTORY SYSTEM HAVING AN APPLICATION INTEGRATION DRIVER INFRASTRUCTURE

RELATED APPLICATION DATA

This application is a continuation of U.S. patent application Ser. No. 09/470,645, entitled COMPUTER DIRECTORY SYSTEM HAVING AN APPLICATION INTEGRATION DRIVER INFRASTRUCTURE, filed Dec. 22, 1999, now U.S. Pat. No. 7,146,614, issued Dec. 5, 2006, which is herein incorporated by reference in its entirety for all intents and purposes.

BACKGROUND

This invention relates generally to computer software, and more specifically to a system and method for allowing an application program to integrate and/or synchronize with a computer directory by providing a driver infrastructure for virtual replicas and the like.

Personal computers or workstations may be linked in a computer network to facilitate the sharing of data, applications files, and other resources. One common type of computer network is a client/server network, where some computers act as servers and others as clients. In a client/server network, the sharing of resources is accomplished through the use of one or more servers. Each server includes a processing unit that is dedicated to managing centralized resources and to sharing these resources with other servers and/or various personal computers and workstations, which are known as the "clients" of the server.

Directories and directory services are often provided to enable a digital environment for a particular resource. One example of a directory service is Novell Directory Services ("NDS") for Novell Netware networks, as provided by Novell, Inc. of Provo, Utah. NDS provides a logical tree-structure view of all resources on the network so that clients can access them without knowing where they are physically located. For a given resource, an entry is made in a directory such as NDS. Specific entries of a directory are only available by directly accessing the directory.

Typically, a directory is established for one or more applications to access. A directory will have, for example, a native application program interface ("API") that provides a set of routines, protocols, and tools for using the directory. In this way, the directory's native API allows programmers to write applications that can utilize the information stored in a directory with appropriate access control. As a result, the applications must conform to the directory.

There has only been marginal success in the arena of application integration with directories. One of the primary problems is that many applications have already been written that utilize the same resources that are defined and managed from a directory. Also, many application programs were created prior to the advent of wide spread directory use. Of course any changes to application programs are inherently delicate, and are therefore undesirable.

Since these software applications cannot (or will not) access an entry as it resides in a particular directory, the applications will instead store information about the resource in their own directory-like data store. This creates a partial duplicate of the information which the application can access. Furthermore, the application can potentially augment the duplicated information. As a result, a given resource may be fractured among a number of applications or data repositories. As the number of applications that utilize a given resource increases, the likelihood of information about a given resource being unsynchronized, and therefore invalid, increases.

Replication is often used to synchronize distributed data within a given application in an automated and unattended manner. Replication enables many computers or computer applications to work with their own local, current copy, or replica, of a resource entry. For database applications where computers are widely distributed (e.g., geographically), replication provides an efficient way for distributed systems to access current information. To alleviate problems caused by partial data duplication, applications often try to maintain the validity of the replica by communicating with other applications that share the data stored in the replica.

However, it is still important for the application to directly access the directory using the directory's native API or online directory service protocols like LDAP, or Lightweight Directory Access Protocol.

It is desired to provide centralized management of distributed resources to applications that utilize those resources, without requiring the applications to be rewritten to utilize the directory directly.

It is also desired to provide a directory interface that does not require updates or changes to an application program.

It is further desired to have a directory maintained as if multiple applications were working on a single, centralized directory.

SUMMARY

In response to these and other problems, an improved system, method and software program is provided for facilitating the use of components running in a computer network. To this end, the improvement provides a driver infrastructure between components such as a distributed directory and a computer application. The driver infrastructure can transform specific directory events into a vendor-neutral data identification system and then use vendor-neutral transformation technologies to transform the neutral data identification into a specific application's data format, and vice-versa.

In one embodiment, the software program includes instructions for receiving an event from the distributed directory into a markup language generation system, such as an extensible markup language ("XML") generator. The XML generator converts the event into XML data and provides the XML data to a transformation system, such as an extensible transformation language ("XSLT") processor and/or a rule processor (generally "transformation processor"). The transformation processor transforms the XML data to a predetermined format. The format can be dictated by a transformation profile, such as a stylesheet and/or one or more rules provided to the transformation processor, the transformation profile being responsive to requirements of the computer application. The transformed data is then provided to the application for the application to use in a conventional manner.

In some embodiments, the transformed data is transmitted to the application through an application shim. Some applications are able to accept input data streams while others are not. For applications in this latter group, the application shim may intercept the transformed data and provide it to the application by using a native application program interface for the application. In this way, if the application does not receive XML data, or some other interface necessity exists, the application shim can appropriately accommodate the application.

In some embodiments, the transformation processor can receive updates to the transformation profile. These updates, along with any changes to the application shim (if necessary), can accommodate any changes in either the distributed directory and/or the application. In this way, changes and/or updates to the distributed directory or the application can be accommodated in a separate, relatively simple manner.

The summary above discusses events going from the distributed directory to the application. However, the present invention also facilitates events going in the opposite direction. In one embodiment, a software program includes instructions for receiving an event from the application. A markup language generation system, such as an XML generator, converts the event into XML data and provides it to a transformation processor. The transformation processor transforms the XML data to a predetermined format required by the distributed directory. The transformed data is then provided to the distributed directory.

In some embodiments, the transformation processor going this opposite direction is the same as the previously mentioned transformation processor. To accommodate the different format requirements of the application and the distributed network, different transformation profiles can be used.

An advantage of the present invention is that it leverages existing text transformation technology to provide a general purpose data transformation.

Another advantage of the present invention is that a new or modified application needs simply to write a new application shim (if necessary) and provide the appropriate transformation profile. This provides easy integration between various applications.

These and other advantages can be readily seen by further examination of the attached figures and the following description.

DETAILED DESCRIPTION OF THE INVENTION

The present invention provides a unique system and method that invites integration between one or more applications and directories without requiring significant changes to the applications. It is understood that the following disclosure provides many different embodiments, or examples, for implementing different features. Techniques and requirements that are only specific to certain embodiments should not be imported into other embodiments. Also, specific examples of networks, components, and formats are described below to simplify the present disclosure. These are, of course, merely examples and are not intended to limit the invention from that described in the claims.

Figure 1:
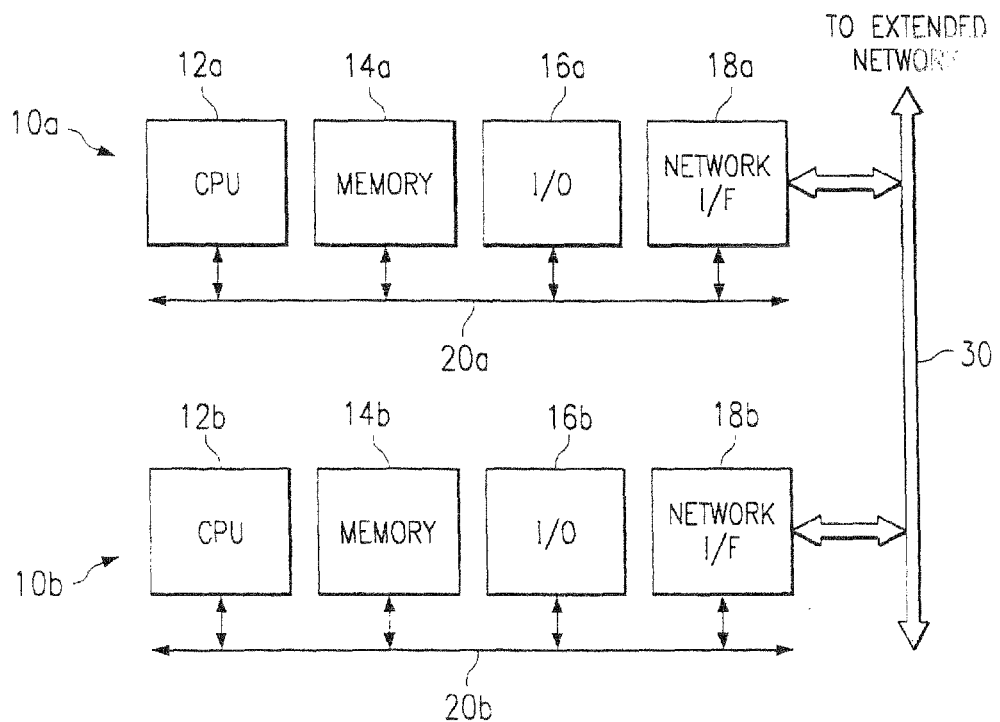
FIG. 1 illustrates a simplified computer system including two computers and a network, the system being used for implementing one embodiment of the present invention.

Referring now to FIG. 1, two similar computer systems, designated 10a and 10b, are illustrated as a representative example of an operating environment for the present invention. Each computer 10a, 10b includes a central processing unit ("cpu") 12a, 12b, a memory unit 14a, 14b, an input/output ("I/O") device 16a, 16b, and a network interface 18a, 18b, respectively. The components 12a, 14a, 16a, and 18a are interconnected by a bus system 20a, and the components 12b, 14b, 16b, and 18b are interconnected by a bus system 20b. It is understood that each of the listed components may actually represent several different components. For example, the cpu 12a may actually represent a multi-processor or a distributed processing system; the memory unit 14b may include different levels of cache memory, main memory, hard disks, and remote storage locations; and the I/O device 16a may include monitors, keyboards, and the like.

The computers 10a, 10b are also commonly connected to a network 30. The network 30 may be representative of several networks, such as a local area network, a company wide intranet, and/or the internet. Because the computers 10a, 10b are connected to the network 30, certain components may, at times, be shared between the computers. Therefore, a wide range of flexibility is anticipated in the configurations of the computers. Furthermore, it is understood that, in many implementations, the computers 10a, 10b may be configured differently from each other, may have different components, and/or one computer may act as a server to the other computer.

The present invention facilitates many different operational scenarios of the computers 10a, 10b and the network 30. Single server environments and multi-server environments, as well as distributed and non-distributed environments, may benefit from the present invention. A distributed, multi-server environment will be discussed below to provide just one example of how the present invention operates.

Figure 2:
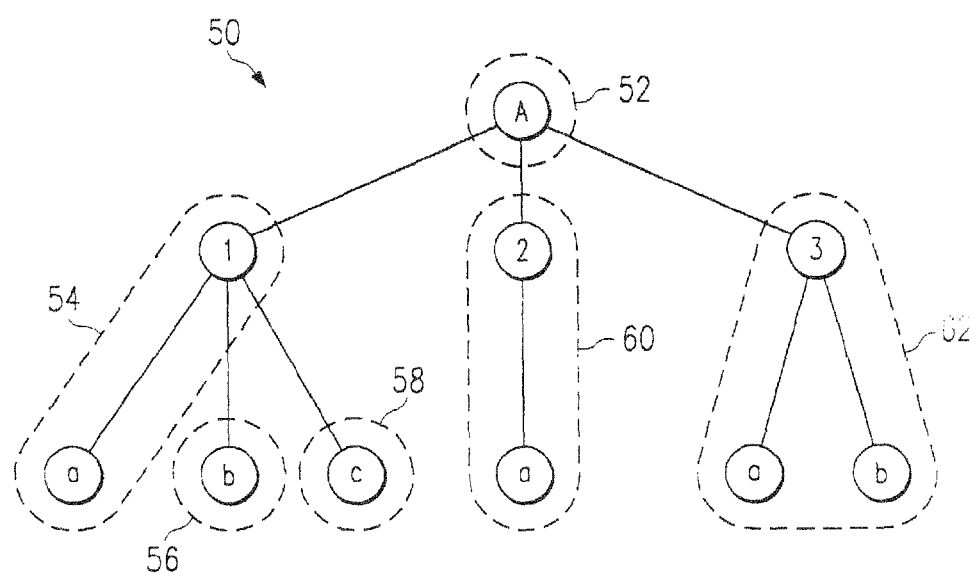
FIG. 2 is a diagram of an exemplary distributed directory system used in the computer system of FIG. 1.

Referring now to FIG. 2, the computers 10a, 10b and the network 30 are used to provide a hierarchical distributed directory system 50. Software running on one or more of the computers 10a, 10b provide the directory service, while applications running on these computers (or other computers) utilize the directory service. The software may be stored on a recordable medium, such as one or both of the memory units 14a, 14b, the network 30, or other medium.

For the sake of example, the directory 50 is a NDS having a logical "tree-structure" view of all resources on the network. As a result, the computers 10a, 10b can access the resources without knowing where the resources are physically located (be it computer 10a, computer 10b, the network 30, or some other entity). For the sake of example, the directory 50 uses an online directory service protocol called LDAP, or Lightweight Directory Access Protocol. The directory includes one or more entries, each of which is a collection of attributes with a unique identifier.

In the present example, the directory 50 is broken into exclusive, non-overlapping "containers." A top level container A is connected to different lower containers 1, 2, 3, which are then connected to even lower containers a, b, c, etc. In furtherance of the present example, the top level container A may represent the overall directory structure for a large company; the containers 1, 2, 3 represent various cities that the company is located; and the lowest containers a, b, c represent different entities of the company, e.g., container a is for sales, container b is for marketing, and container c is for engineering. By combining the container names for more definite reference, sales 1a, 2a, 3a is in every city, marketing 1b, 3b is in two cities, and engineering 1c is only in one city.

One or more contiguous containers can be grouped into a single partition. A partition is a logical construct defined by software. Although a partition may be responsive to physical constraints (e.g., specific portions of a computer hard drive), it is not limited to a single physical location. In the present example, container A is in a partition 52; containers 1 and 1a are in a partition 54; container 1b is in a partition 56; containers 1c is in a partition 58; containers 2 and 2a are in a partition 60; and containers 3, 3a, and 3b are in a partition 62.

A computer, such as the computer 10a, can be configured as a server for storing one or more partitions and/or having a replica of one or more partitions. Replication synchronizes the distributed databases by routinely copying specific partition(s) to other servers in the network. Although replicas may be stored in one or more servers, any changes to data in a replica will replicate to the other servers storing the same data.

An application must be aware of the directory's structure, including any recent changes, upgrades, modifications, and so forth. Many applications are not created to access the directory structure (e.g., the application may not have been rewritten to utilize directory data access methods), and instead create a partial duplicate of this structure in their own directory-like data store. Because existing applications may not be rewritten (due to technical, financial; or other restraints) to directly access the directory, portions of the directory will be fractured among a number of applications or data repositories.

Figure 3:
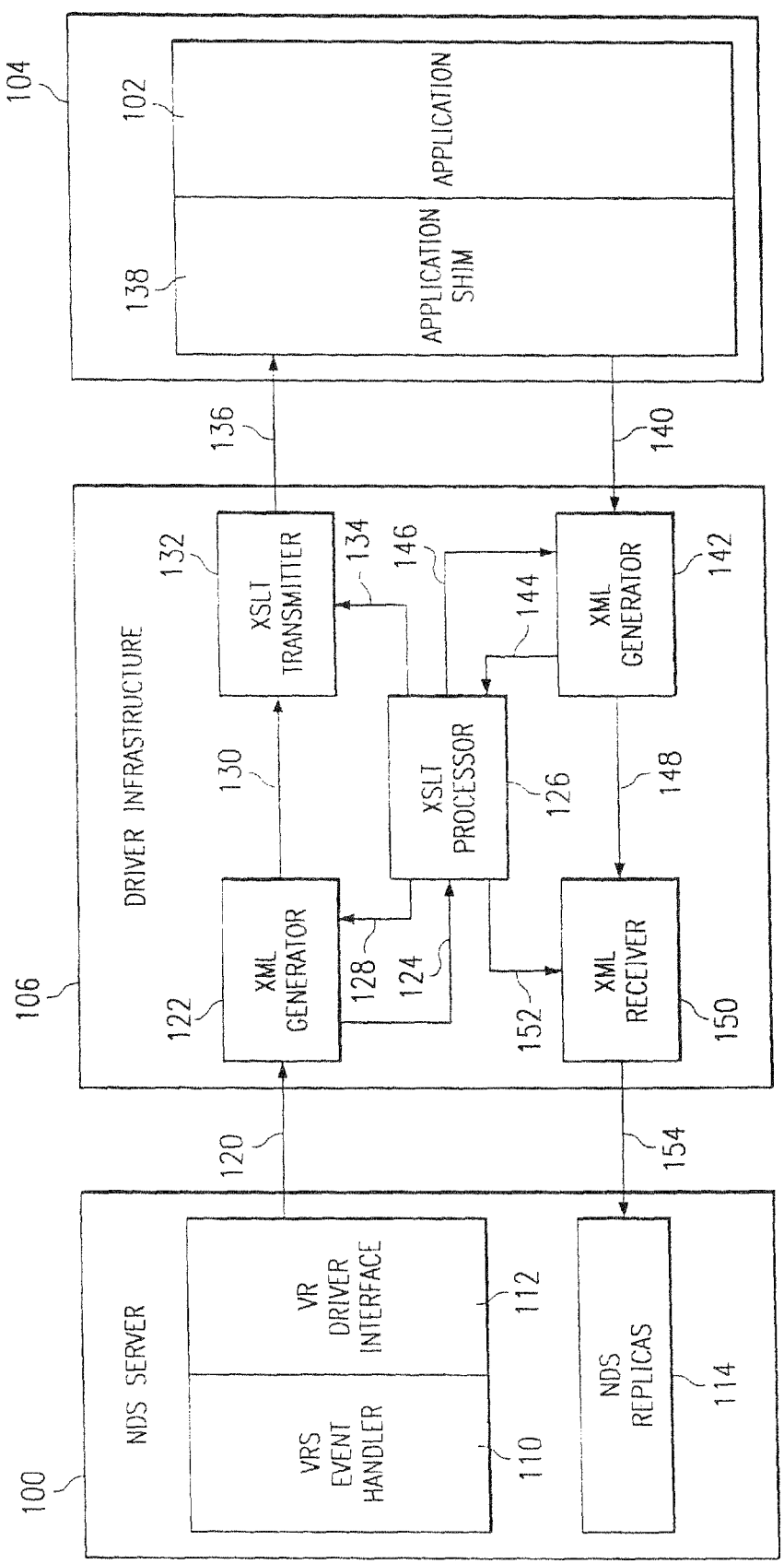
FIG. 3 is a functional description of the computer system of FIG. 1 and the distributed directory system of FIG. 2. The functional description of FIG. 3 also illustrates a routine, such as can be implemented by a software program, for implementing one embodiment of the present invention.

Referring now to FIG. 3, instead of forcing the applications to access the directory, the present invention brings the directory to the applications. FIG. 3 provides a functional description of the computers 10a, 10b (FIG. 1) and the directory 50 (FIG. 2). Since the actual number and the physical arrangement of the computers, directories, and the associated applications is inconsequential, the functional description of FIG. 3 facilitates a broader understanding of the invention.

In continuance of the present example, a NDS server 100 interfaces with an application 102 residing in a system 104. Located between the server 100 and the system 104 is an application-integration driver infrastructure (designated generally "driver infrastructure") 106. It is understood that the NDS server 100, the driver infrastructure 106, and the system 104 may physically reside on one or more different computers.

In the present example, the driver infrastructure 106 is responsible for converting NDS replication events to XML (extensible markup language). XML is a common, flexible set of codes for indicating type, purpose, or structure of text in an application or directory, but is not specific to the application, directory, or even the specific vendor of the application or directory (i.e., it is vendor neutral). The driver infrastructure 106 also uses XSLT (Extensible Stylesheet Language Transformations) for defining actions that should be applied to the directory information XML to transform the directory information into an application native format. One example of directory information XML is Novell's DirXML, which is a technique that allows a user to create an application view of the information in the directory and then replicate that information via XML and an XSLT processor.

XSLT describes how the XML, text is to be transformed into different XML text according to a formatting vocabulary. An extensible stylesheet language (XSL) defines a style, to be used by the XSLT, for specifying how to transform the XML text. XSL has two parts: a language for transforming trees, and a vocabulary of formatting objects. The application of XSL has heretofore been used only with publishing systems. The present invention applies XSL to directory integration for synchronizing multiple data repositories in a general fashion. The XML text can also be transformed by one or more rules and other transformation techniques. XML and XSL are just one example of generic data description, text conversion and transformation technology tools that can be used to implement the present invention.

The NDS server 100 includes an event handler 110, a driver interface 112, and a replica 114. The replica 114 represents at least a portion of the directory 50 (FIG. 2) that is stored in the NDS server 100. When a change is made to specific information (e.g., a phone number is changed somewhere in the directory 50), that change is replicated to the virtual replica 114. The event handler 110 is notified of the change and causes an event. In the present example, the event handler 110 receives filtered NDS events via an NDS Event system (not shown) and hands the events off to the driver interface 112. The event handler also checks for local transaction events and discards any events that should not be provided to the driver interface. The driver interface 112 picks up that event, validates the event (e.g., makes sure it is something to be handled), and then hands it off to the driver infrastructure 106.

The driver infrastructure 106 performs a routine to transfer the event to the application 102. At step 120, the event (formatted as NDS data) is provided to an XML generator 122, which converts the NDS data into XML. In continuance of the present example, an NDS event such as the change to the phone number is converted into NDS formatted XML.

At step 124, the XMI, data is provided to a transformation processor 126, which has a transformation profile that tells it how to transform the received information. The transformation profile may include a stylesheet and/or one or more rules. For example, the stylesheet may define a policy for the subset of NDS information that will be propagated to the application, and a data map for how a universal schema (e.g., NDS) is translated into an application specific schema. The transformation processor 126, which in this example includes an XSLT processor for utilizing the stylesheet, then transforms the format of the XML data to one appropriate for the application 102 (i.e., application data format). This application data format may be specific to the particular application 102, or may be another XML format.

For another example, one or more rules may be provided to the transformation processor 126 instead of, or along with the stylesheet. In this example, the transformation includes a rules processor to transform the format of the XML data to one appropriate for the application 102. In the present embodiment, the rules apply to XML, such as a schema mapping rule and or a matching rule. Formatting using rules such as these is often better suited than using XSL. It is understood that the transformation processor 126 may utilize an XSLT processor, a rules processor, both, or neither.

At step 128, execution returns to the XML generator 122 and at step 130, proceeds to an XSLT transmitter 132. Alternatively, execution may proceed directly from the XSLT processor 126 to the XSLT transmitter 132 at step 134. At step 136, the XSLT transmitter 132 passes the processed data to an application shim 138 located on the system 104. The processed data can be XSL, XML, LDIF. (LDAP Data Interchange Format), or any appropriate format.

The application shim 138 is a routine that bridges the gap between the driver infrastructure 106 and the application 102 by calling the application's APTs. In some embodiments where the application 102 already receives XML format, the application shim 138 may be unnecessary. Consider for example that the application 102 is a Netscape directory which has an API called LDAP modify, as provided by Netscape Comm. Corp. of Mountain View, Calif. The LDAP modify API is capable of receiving and transmitting data in DTF. In this example, the XSLT processor 126 creates an DIF. data file, the XSLT transmitter 132 provides the file to the application shim 138, the application shim calls the LDAP modify API, and the LDAP modify API imports the DIF. data into the Netscape directory 102. In this way, the application shim 138 is totally dependent on the application 102.

The driver infrastructure 106 works equally well in the opposite direction—from the application 102 to the NDS server 100. The application shim 138 must be aware of an event occurring in the application 102. This can happen by various methods, such as interrupts, polling, and so forth. If required, the application shim 138 can convert changes in the application's native directory into an application native XML format, and then submit that XML data stream to the driver infrastructure 106.

At step 140, the event (formatted as application data) is provided to an XML generator 142, which converts the application data into XML. At step 144, the XML data is provided to the transformation processor 126, which has a profile that tells it how to transform the received information. A separate transformation profile may be required to do transformations in this opposite direction, as compared to the profile for data going from the replica 114 to the application 102.

The XSLT processor 126 then changes the format of the XML data to one appropriate for the NDS server 100 (e.g., NDS data format). This NDS data format may be specific to the NDS server, or may be another XML format. At step 146, execution returns to the XML generator 142 and at step 148, proceeds to an XSLT receiver 150. Alternatively, execution may proceed directly from the XSLT-processor 126 to the XSLT receiver 150 at step 152. At step 154, the XSLT receiver 150 calls the APIs for the NDS server 100 and passes the processed data as NCP (Netware core protocol) requests to the NDS replica 114 located on the NDS server. The replica 114 then propagates the changes to any other replicas (if any exist) as replication events.

In the present example, the driver infrastructure 106 resides on the NDS server 100 (e.g., computer 10a of FIG. 1) and the application 102 resides on the system 104 (e.g., computer 10b of FIG. 1). The application shim 138 can reside on the NDS server 100, on the system 104, some other remote system, or split there between. If the application shim 138 is on a system other than the system 104, it can take advantage of remote APTs (like LDAP modify).

In summary, several different processing structures are disclosed, some or all of which may be utilized to implement the present invention. In the examples discussed above, the driver infrastructure is responsible for converting replication events to a set of codes for indicating type, purpose, or structure for application consumption. The driver infrastructure also receives a set of codes from the application and provides it to the server.

A server/driver infrastructure interface is responsible for the receipt of filtered events and converting them to the appropriate data format. It then hands the formatted data to a transformation processor. In the above example, this interface includes the XML generator 122, which converts NDS events into NDS formatted XML, and the XML receiver 150, which converts NDS formatted XML events into NCP requests to the NDS replicas 114.

A system/driver infrastructure interface is responsible for the transmission and receipt of transformed events to the application 102. If the application has an event interface and/or is able to accept the events directly, then this component is not required. Otherwise, as in the above examples, the application shim 138 will accept application native data stream from the driver infrastructure 106 and process it into application native APIs. It also will convert changes in the application native directory into an application native XML format, for submission to the driver infrastructure 106.

An advantage of the present invention is that it leverages a technology like XML to provide a general purpose transformation.

Another advantage of the present invention is that a new or modified application needs simply to write a new application shim (if necessary) and provide the appropriate transformation profile(s). This provides easy integration between various applications without incurring the prohibitive costs of rewriting the application.

Another advantage of the present invention is that by storing the policy and data mapping information within NDS by using a structure like the transformation processor 126, application integration is simplified.

As discussed above in the Summary, the invention is directed toward facilitating the use of components running on a computer network. While the above description focuses on an embodiment of the invention sharing events between a distributed directory (an example of a component) and applications, a person skilled in the art will recognize that embodiments of the invention are not limited to the component being a distributed directory. For example, the data being shared could be policy information, in which case the component with which the applications interact could be a policy manager. Or the data being shared could be data from a database, in which the component could be a database manager. Or the data being shared could be data from another application, permitting the applications to communicate with each other without having to understand each other's data formats. A person skilled in the art will recognize other possible components that can generate events.

It is further understood that other modifications, changes and substitutions are intended in the foregoing disclosure and in some instances some features of the disclosure will be employed without corresponding use of other features. Accordingly, it is appropriate that the appended claims be construed broadly and in a manner consistent with the scope of the disclosure.

The invention claimed is:

1. A software program for transforming events in a computer network, the program comprising being stored on a recordable medium and including instructions for:
   detecting an event through notification from an event handler of a component;
   receiving the event into an XML generator from the component;
   converting the event into XML data representing the event;
   transforming the XML data representing the event to a first predetermined format by a transformation processor using a first stylesheet, the first predetermined format being responsive to a first application running in the computer network;
   transmitting the transformed XML data representing the event in the first predetermined format to the first application through a first application shim to provide the transformed XML data representing the event to the first application by using a first native application program interface for the first application, where the first application is unable to receive an input data stream except through the first application shim;
   transforming the XML data representing the event to a second predetermined format by the transformation processor using a second stylesheet, the second predetermined format being responsive to a second application running in the computer network;
   transmitting the transformed XML data representing the event in the second predetermined format to the second application through a second application shim to provide the transformed XML data representing the event to the second application by using a second native application program interface for the second application, where the second application is unable to receive an input data stream except through the second application shim; and receiving updates to the first stylesheet responsive to any changes in either the component or the first application.

2. The software program of claim 1, wherein the first predetermined format and the second predetermined format are the same predetermined format.

3. A distributed computer system, comprising:
a first processor connected to a network for executing computer code;
a second processor connected to the network for executing computer code;
a first memory connected to the first processor;
a second memory connected to the second processor;
a first application, a portion of which being stored in one of the first memory and the second memory;
a second application, a portion of which being stored in one of the first memory and the second memory;
a first transformation profile defining a first predetermined format for use by the first application;
a second transformation profile defining a second predetermined format for use by the second application;
software for detecting an event through notification from an event handler of a Component;
software for receiving the event from the component;
software for converting the event to a generic data description before transforming the event, wherein the generic data description is in a markup language;
software for transforming the event to the first predetermined format by using a generic transformation tool and the first transformation profile;
software for transforming the event to the second predetermined format by using the generic transformation tool and the second transformation profile;
software for providing to the first application the event transformed to the first predetermined format, including a first application shim for the first application to receive the transformed event and provide the event to the first application by using a first native application program interface for the first application, where the first application is unable to receive an input data stream except through the first application shim;
software for providing to the second application the event transformed to the second predetermined format, including a second application shim for the second application to receive the transformed event and provide the event to the second application by using a second native application program interface for the second application, where the second application is unable to receive an input data stream except through the second application shim; and
software to receive updates to the first transformation profile responsive to any changes in either the component or the first application.

4. The system of claim 3, wherein the generic transformation tool includes a markup language and the software for transforming the event includes a transformation processor.

5. The system of claim 3, further comprising:
a component transformation profile defining a predetermined format for use by the component;
software for detecting an application event in the first application;

software for transforming the application event to the component predetermined format by using the generic transformation tool and the component transformation profile; and
software for providing the transformed application event to the component.

6. The system of claim 5, further comprising:
software for detecting a second application event in the second application;
software for transforming the second application event to the component predetermined format by using the generic transformation tool and the component transformation profile; and
software for providing the transformed second application event to the component.

7. A method for interfacing with a component in a computing system, comprising:
identifying a first transformation profile defining a first predetermined format for use by a first application wherein the first transformation profile includes a stylesheet;
identifying a second transformation profile defining a second predetermined format for use by a second application;
receiving notification of an event from an event handler of the component;
receiving the event from the component;
converting the event to a generic data description before transforming the event, wherein the generic data description is in a markup language;
transforming the event to the first predetermined format by using a transformation tool and the first transformation profile;
transforming the event to the second predetermined format by using the transformation tool and the second transformation profile;
providing to the first application the event transformed to the first predetermined format, including providing an application shim for the first application to receive the event transformed to the first predetermined format and to provide the event to the first application by using a native application program interface for the first application, where the first application is unable to receive an input data stream except through the application shim; and
providing to the second application the event transformed to the second predetermined format, providing a second application shim for the second application to receive the event transformed to the second predetermined format and to provide the event to the second application by using a second native application program interface for the second application, where the second application is unable to receive an input data stream except through the second application shim; and
receiving updates to the first transformation profile responsive to any changes in either the component or the first application.

8. The method of claim 7, further comprising updating the application shim and the first transformation profile responsive to changes in the first application.

9. The method of claim 7, further comprising updating the second application shim and the second transformation profile responsive to changes in the second application.

10. The method of claim 7, further comprising storing the first transformation profile with the component.

11. A computer-readable medium storing a driver infrastructure for interfacing a component and applications, comprising:
- a generator to receive an event from the component and to generate a generic data for the event, wherein the generic data is in a markup language;
- a first transformation profile defining a first predetermined format for use by a first application, wherein the first transformation profile includes a stylesheet;
- a second transformation profile defining a second predetermined format for use by a second application;
- a transformation processor to transform the generic data for the event into a first application data for the first application using the first transformation profile and to transform the generic data for the event into a second application data for the second application using the second transformation profile;
- a transmitter to transmit the first application data to the first application and to transmit the second application data to the second application, including:
  - a first application shim for the first application to receive the first application data and provide the first application data to the first application by using a first native application program interface for the first application, where the first application is unable to receive an input data stream except through the first application shim; and
  - a second application shim for the second application to receive the second application data and provide the second application data to the second application by using a second native application program interface for the second application, where the second application is unable to receive an input data stream except through the second application shim; and
- software to receive updates to the first transformation profile responsive to any changes in either the component or the first application.

12. A driver infrastructure according to claim 11, wherein:
- the driver infrastructure further comprises a second generator to receive an application event from the first application and to generate a second generic data for the application event;
- the transformation processor is operative to transform the second generic data for the application event into a data; and
- the transmitter is operative to transmit the data to the component.

13. A driver infrastructure according to claim 11, wherein the generator is operative to receive the event from a third application via an application shim, where the third application is unable to communicate with the program except through the application shim.

* * * * *